United States Patent [19]

Artieri

[11] Patent Number: 5,421,010

[45] Date of Patent: May 30, 1995

[54] CIRCUIT AND A METHOD FOR SELECTING THE KAPPA GREATEST DATA IN A DATA SEQUENCE

[75] Inventor: Alain Artieri, Meylan, France

[73] Assignee: SGS-Thomson Microelectronics, S.A., Gentilly, France

[21] Appl. No.: 267,293

[22] Filed: Jun. 28, 1994

Related U.S. Application Data

[63] Continuation of Ser. No. 838,668, Feb. 20, 1992, abandoned.

[30] Foreign Application Priority Data

Feb. 21, 1991 [FR] France ............... 91/02301

[51] Int. Cl.⁶ .................................... G06F 7/24
[52] U.S. Cl. .............. 395/600; 364/DIG. 1 MS File; 364/DIG 2 MS File; 364/259; 364/947
[58] Field of Search .................. 364/DIG. 1, DIG. 2; 395/400, 425, 600, 650, 700, 800, 375

[56] References Cited

U.S. PATENT DOCUMENTS 4,317,182  2/1982  Takase et al. .............. 364/734

FOREIGN PATENT DOCUMENTS 0273802  7/1988  European Pat. Off. .

OTHER PUBLICATIONS

Patent Abstracts of Japan, vol. 015, No. 121 (E-1049) Mar. 25, 1991.
"A Bit-serial Device for Extracting a Vector Element of a Specified Rank", C. K. Yuen, Digital Processes, vol. 6, No. 2-3, 1980, pp. 207-210.

*Primary Examiner*—Robert B. Harrell
*Attorney, Agent, or Firm*—Robert Groover; Betty Formby

[57] ABSTRACT

A method for sorting the k greatest ones of a sequence of n incoming data values, by: a) sequentially writing each data value into one of n one-word memories, in a word format which includes, in decreasing weight order, the following bits: a first inhibition bit (MI), a second selection bit (MS), third data bits (MD), and fourth bits (MP) representative of the position of the incoming datum; b) setting the first bits (MI) of the n words during the arrival of the first signal; c) while writing each data value, resetting the first (MI) and second (MS) bits of the corresponding word; and d) between the arrivals of the $(n-k)^{th}$ datum and $n^{th}$ datum, detecting the smallest word stored in the memories and setting its second bit (MS).

20 Claims, 4 Drawing Sheets

CIRCUIT AND A METHOD FOR SELECTING THE KAPPA GREATEST DATA IN A DATA SEQUENCE

This is a continuation of application Ser. No. 07/838,668, filed Feb. 20, 1992, now abandoned.

BACKGROUND OF THE INVENTION

The present invention relates to circuits for sorting data according to a predetermined criterion and particularly to a circuit enabling to sort the k greatest data among sequentially incoming data.

Such sorting circuits are for example useful in the field of image compression systems. Indeed, in this field, it is desired to transmit as few data as possible representing an image in the best possible way. In particular, data are cancelled according to a predetermined criterion in order to increase the compression efficiency while decreasing the complexity and processing time which increase along with the number of non-null data.

In image compression systems, images are divided into blocks, for example 8×8 pixels, associated with matrices, each coefficient of which represents the luminance and chrominance information of a pixel. These matrices are subject, for example, to a discrete cosine transform (DCT); then, one obtains transformed matrices of equal size, the advantage of which is to have many practically null coefficients.

It has been noticed that by cancelling a certain number of small coefficients of the transformed matrix, then by submitting this matrix to a reverse cosine transform, it was possible to restore an image without significant degradation.

A first technique of the prior art for providing the greatest coefficients of the transformed matrix consists of sequentially reading the coefficients and comparing them with a threshold value in order to cancel the coefficients that are smaller than the threshold. The drawback of this technique is that all the coefficients of a matrix are cancelled if they are too small; this causes significant degradation of the restored image because the largest of such small coefficients carry a significant information. Another drawback is that none of the coefficients are cancelled if they all are larger than the threshold; in this case the desired compression is not achieved.

Another approach consists of keeping only a predetermined number k of the largest data values. This prevents cancellation of small values, that are nevertheless representative of the image, and also ensures that no more than k data values will have to be processed during subsequent steps. The known circuits for implementing this technique have had the drawback of being complex and relatively slow.

The disclosed inventions provides a simple method for implementing this other technique.

SUMMARY OF THE INVENTION

The preferred embodiment of the invention provides a method of sorting the k greatest data in a sequence of n data sequentially incoming in the form of binary logic signals, comprising the following steps: a) sequentially writing each datum in one of n memories each adapted to receive one word comprising in a decreasing weight order the following bits: a first inhibition bit, a second selection bit, third data bits, fourth bits corresponding to a number representative of the rank of the incoming datum; b) setting to "1" the first bits of the n words when the first signal of the data sequence occurs; c) while writing each datum, resetting the first and second bits of the corresponding word; d) between the arrivals of the signals corresponding to the $(n-k)^{th}$ datum and $n^{th}$ datum, detecting the smallest word stored in the memories and setting its second bit to "1"; and e) as soon as signals corresponding to the $n^{th}$ datum have arrived, sequentially reading the stored data and processing the data associated to a word having its second bit to "1" differently from those associated with a word having its second bit equal to "0".

According to one embodiment of the invention, during step e), data are read according to the sequence they have been written during step a).

The invention further provides apparatus for sorting the k greatest data in a sequence of n data sequentially arriving on an input bus as binary logic signals, comprising: a memory point matrix of n columns and m rows, each column being assigned to a word corresponding to one of the data and comprising in the order of increasing row numbers and decreasing bit weights: a first inhibition memory point set to "1" by an initialization signal and reset by the incoming datum, a second selection memory point connected to an output bus line, reset by the incoming datum, third memory points connected to the lines of the data input bus and of a data output bus, for receiving and storing the datum, and fourth memory points containing a number representative of the incoming datum rank; a first circuit for addressing each of the columns according to the incoming rate of the data and storing therein the datum present on the lines of the input bus; a second circuit active only between the arrival of the $(n-k)^{th}$ datum and the $n^{th}$ datum for detecting the smallest word and setting its second memory point as soon as the next datum has arrived; and a third circuit for addressing each of the columns according to the incoming rate of data and writing the bits contained in the second and third memory points on the lines of the data output bus as soon as the $n^{th}$ datum is written.

According to another embodiment of the invention, the second circuit is constituted by modules, each being associated with a memory point and comprising: a connection at the output Q of the associated memory point, an exclusion output $X_{ij}$, which, if the arriving row i is the last one, is connected to a set input of the second memory point of the current column j, an intermediate output, an exclusion input connected, either to the exclusion output $x_{i-1,j}$ of the module of the current column j and of the preceding row $i-j$, or to a reset input if the current row is the first, a detection input connected to the output Zi of a logic detection means common to all modules of the current row j and receiving at the input the intermediate outputs of these modules; output $X_{ij}$ taking the values listed in the following table where symbol "#" indifferently designates 0 or 1:

| $z_i$ | $x_{i-1,j}$ | $x_{ij}$ |
|---|---|---|
| # | 1 | 1 |
| 0 | 0 | 0 |
| 1 | 0 | Q | the intermediate output taking value 1 if the output $x_{i-1,j}$ is set to "1" and/or if output Q is set to "1".

According to still another embodiment of the invention, the logic detection means provides the value 0 at its output $Z_i$ only when all the intermediate outputs of the modules of the current row; are set to "1".

According to a further embodiment of the invention, the circuits for addressing each column comprise a shift register.

Still according to an embodiment of the invention, the second memory points are authorized to be set to "1" by an active enabling signal between arrivals of the $(n-k)^{th}$ datum and $n^{th}$ datum.

An advantage of the invention is that the selection of the k greatest data is achieved as soon as the last data of a sequence has arrived, while in the prior art it is necessary to sort out and order data in decreasing order in a memory, then, to sort out the k first ones.

BRIEF DESCRIPTION OF THE DRAWINGS

The foregoing and other objects, features and advantages of the invention will be apparent from the following detailed description of preferred embodiments as illustrated in the accompanying figures wherein:

FIGS. 1A, 1B, 1C, 1D, 1E, 1F, 1G, 1H, 1J, 1K, 1L, 1M, 1N, 1O, and 1P represent one after the other the successive steps of the method according to the invention in a practical case;

DETAILED DESCRIPTION OF THE INVENTION

Figure 2:
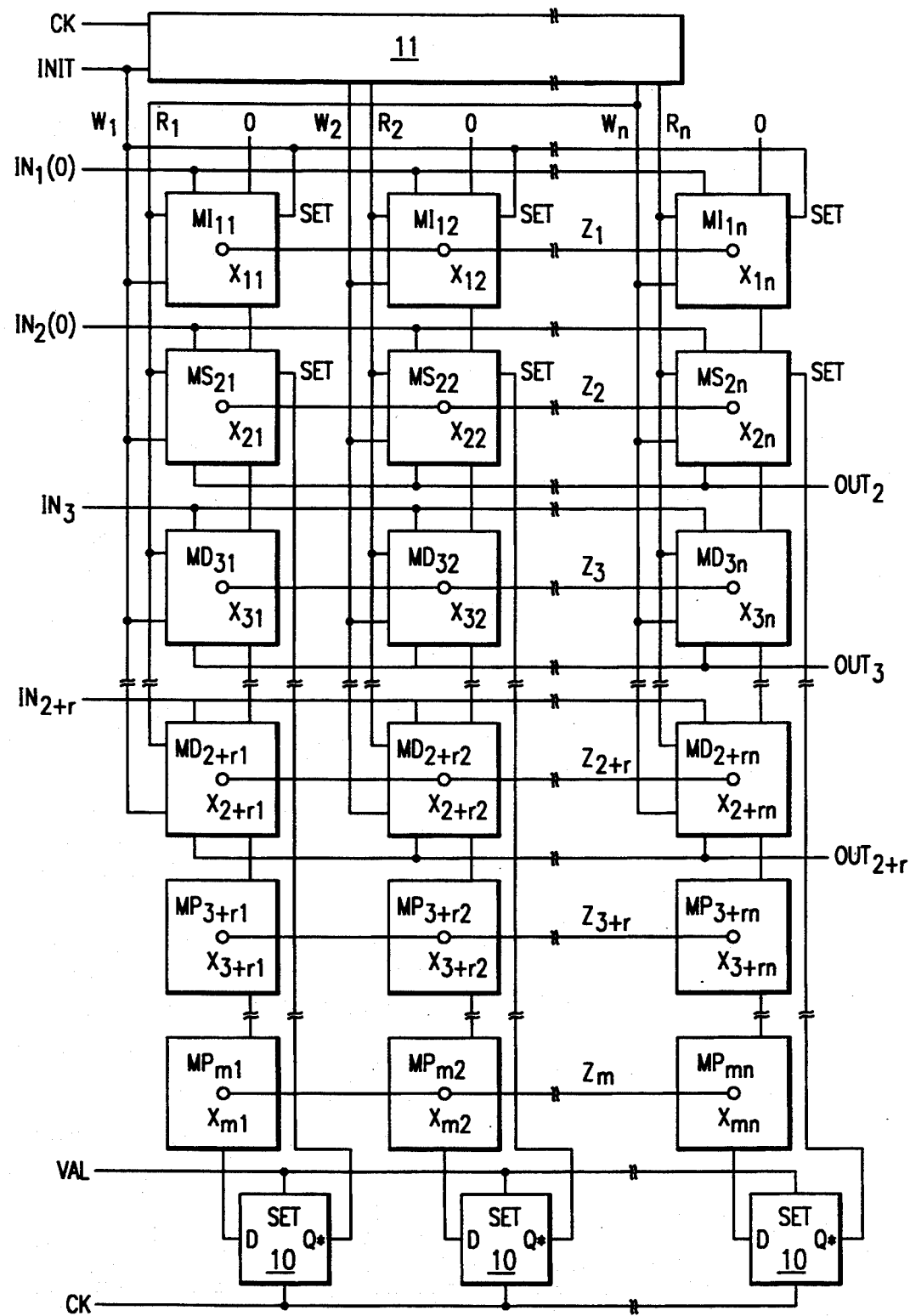
FIG. 2 is a simplified modular diagram of one embodiment of the selection circuit according to the invention.

To simplify explanations, the method according to the invention will be described in its application to the sequence involving the 8 following data:

D1=1
D2=5
D3=7
D4=8
D5=5
D6=4
D7=8
DS: 2 and assume that it is desired to select the k=4 greatest data. Two solutions are possible: (D4, D7, D3, D2) or (D4, D7, D3, D5); therefore, one of data D2 or D5 is to be suppressed. In the present case, it is chosen to keep the datum with the lower index, here D2. For this purpose, new data D'1-D'8 are formed from data D1-D8 by juxtaposing on the right a priority coefficient $n-j$ where n designates the value of data points in the sequence (here n=8) and j the incoming rank of the considered datum. The modified sequence of data is then:

D'1=17
D'2=56
D'3=75
D'4=84
D'6=42
D'7=81
D'8=20

Thus, it is ensured that there is only one solution for the four greatest values of the data sequence (D'2=56 has become greater than D'5=53). It will be noted that, although decreasing priority coefficients have been chosen, increasing values could have been chosen in order to keep the data with the greatest index to avoid ambiguity. This point being solved, in order to select the four greatest data, one proceeds as explained hereafter.

In the following, any element affected with index j corresponds to the $j^{th}$ datum of the sequence.

According to the invention, with each datum Dj in binary mode is associated a word comprising additional bits, namely, in decreasing order of bit weight, an inhibition bit $I_j$, a selection bit $S_j$, data bits $D_j$, and priority bits $P_j$. Bits $P_j$ represent in binary mode a priority coefficient $n-j$ (here $8-j$).

Each of the words is stored in a memory, for example in a column. The content of the memory is illustrated in a table shown in FIGS. 1A-1P at various filling steps, the first row representing the states of inhibition bits I, the second row the states of selection bits S, the third row the decimal values of data D and the fourth the decimal values of the priority coefficients P.

FIG. 1A shows the state of this table as soon as the first datum D1 of a sequence of 8 data occurs. Symbol "#" represents a random value.

As soon as the first datum D1 occurs, bits I of the 8 columns are set. The first column is selected for writing (such column being designated with letter W on top of the column). Datum D1 is written in the column and simultaneously bits I1 and S1 are reset.

In FIGS. 1B-1D, as each of the next three data values D2-D4 arrives, the next three columns are successively selected for writing, data are respectively written in the columns, and the corresponding inhibition and selection bits I and S are reset.

In FIG. 1E, the fifth datum Ds is written in the same way in the fifth column of the table. At this stage, the smallest word in the 8 columns is detected, the detection being represented by a framed column. Of course, it is one of the words of the first 5 columns since their first inhibition bits I have been reset while the first inhibition bits I of the words of the other columns remain set. In the given example, it is the word of the first column; its selection bit S1 is set to "1" as soon as the next datum D6 incomes, as shown in FIG. 1F. Setting to "1" is indicated by a framed 1. Because the selection bit S1 of the word of the first column (the smallest) is set, it becomes the greatest among the five that have just been written and it will no longer be selected as the smallest during the subsequent comparisons.

Data D6-D8 are similarly written in columns 6-8 during the steps illustrated in FIGS. 1F-1H. One successively detects that the words of columns 6, 5 and 8 are the smallest and their selection bits $S_6$, $S_5$ and $S_8$ are set.

Once the last datum D8 has been written, a smallest word is no longer detected in the columns until the fourth datum of a new data sequence incomes.

In FIG. 1H, while datum D8 is being written, the data reading sequence is started. During writing of datum D8 and the seven following time intervals, illustrated in FIGS. 1I-1O, each datum is read in its arrival order with the corresponding selection bit S. A column selected for reading is designated with letter R on its top. Thus, selection bit S marks with a 0 the four greatest data and with 1 the others. Then, it is possible, for example as part of an application to image compression, to cancel the data marked with 1.

A drawback may result from the fact that the first datum D1 is the last datum marked by setting of with bit S1. In this case, in FIG. 1H, datum D1 will be read with its selection bit S1 which has not yet been set a "1", since this bit will be set to "1" only the next time interval, as shown in FIG. 1I. In the applications where the circuit of the invention is most preferably used, this situation never appears because the first data are the greatest, especially when the circuit processes data from a cosine transform. However, a solution to this drawback is proposed in FIG. 5.

It will be noticed that it is possible to start writing new data in the columns as soon as a second datum D2 is being read. Thus, for example in FIG. 1I, simultaneously, the first datum $E_1$ of a sequence of data $E_1$-$E_8$ is written, datum $D_2$ of the previous sequence is read and the selection bit, here S8, of the last smallest word, is set to "1". The incoming datum $E_1$ forces bits I of the 8 columns to a "1" then forces a "0" bits I and S of the first column. In FIGS. 1J-1P, data $E_2$-$E_8$ are written as described for data D. Datum $E_1$ may also income at any subsequent time interval (even after reading of datum $D_1$).

This method is easy to generalize for selecting the k greatest data in a sequence of n data. There are n words and columns (instead of 8), and the selection of the (n−k) smallest of these n words is operative after the arrival of the (−k) th datum. After arrival of the $n^{th}$ datum, the selection becomes inactive the (n−k) smallest columns having been marked by setting their selection bits S to a "1". Thus, the other k columns are marked with a 0 for their corresponding selection bits S; this indicates that the k largest data are written in these columns. During the next n time intervals, the n data are read together with their selection bits S, so that it is possible to cancel those having a "1" as their selection bits S.

FIG. 2 shows a specific embodiment of a circuit implementing the above described method. The circuit comprises a matrix of modules for bit storing and processing. Thus, in the above case, where it is desired to process sequences of n data, the matrix comprises n columns, like those in the tables of Figs 1A and 1B. In addition, the matrix comprises m rows, where m corresponds to the number of bits in a column of the above described tables. The first row comprises MI modules ($MI_{11}$...$MI_{1j}$...$MI_{1n}$) for storing the inhibition bits I. The second row comprises modules MS ($MS_{21}$...$MS_{2j}$...$MS_{2n}$) for storing the selection bits S. The r next rows (r being the number of bits of a datum to be processed) comprise modules MD ($MD_{31}$,...$MD_{3j}$...$MD_{3n}$ to $MD_{2+r,1}$...$MD_{2+r,j}$...$MD_{2+r,n}$) The p last rows comprise priority modules MP ($MP_{3+r,1}$...$MP_{3+r,j}$...$MP_{3+r,n}$ to $MP_{m1}$...$MP_{mj}$...$MP_{mn}$) for storing in binary mode the priority words designated by letter P in the tables of FIGS. 1A-1P (p represents the number of bits necessary for coding numbers 0 to n−1).

In the following description, i is a row index. Each module comprises: an input bit input (except for modules MP), an output bit (except for modules MI and MP), an exclusion input, an exclusion output $X_{ij}$, a read enable input (except for MP modules) and a write enable input (except for modules MP). Modules MI and MS additionally comprise a SET input. Modules MP code in binary mode priority coefficients in a fixed way.

For each module of the same row i, the bit input is connected to a line $IN_i$ of an input bus, the bit output being connected to a line $OUT_i$ of an output bus and the exclusion output $X_{ij}$ being connected to the exclusion input of the module of the next row i+1.

Figure 3:
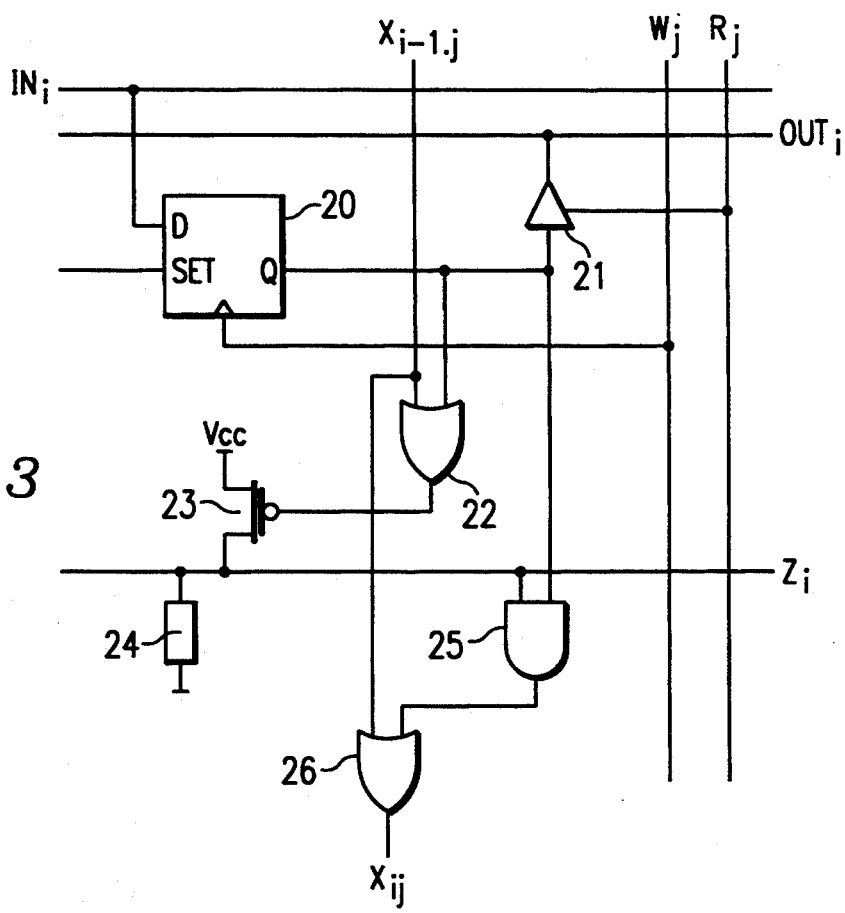
FIG. 3 is an electrical diagram illustrating one of the modules of FIG. 2.

All the modules of a row i are also connected to a common line $Z_i$, the function of which will be understood with the explanation given in FIG. 3.

For each module of a same column j, the write enable input is connected to a line $W_j$ of a write address bus and the read enable input is connected to a line $R_j$ of a read address bus. The first read line $R_i$ is connected to the last write line $W_n$, which causes reading of the first column and writing of the last, simultaneously. Lines W and R are controlled by a conventional addressing circuit 11, constituted, for example, by a shift register, controlled by a clock CK and by an initialization signal INIT which is also applied to the first write line $W_1$.

The bit inputs of the first two rows are connected to the logic level 0 (ground). The exclusion inputs of modules MI are connected to the logic level O. The exclusion output $X_{mj}$ of each module $MP_{mj}$ of the last row is connected to the input D of a flip-flop 10.

Each D-type flip-flop 10 comprises an inverted output Q* connected to the SET input of module MS of the corresponding column, an enabling input connected to a clock CK and a SET input connected to an enabling line VAL common to all flip-flops 10.

Thus, considering the columns, as shown by FIG. 2, in each column of the modules MI, MS, MD and MP there is a memory point adapted to store a bit of the word as contained in the corresponding column of the tables of FIGS. 1A-1P.

During data writing phases, such as illustrated in FIGS. 1A-1H, successive data are written in modules MD of successive columns. The comparison operations are active for the k last written data.

Each module MI, MS, MD and MP comprises, in addition to the memory point, a logic processing unit which, in combination with the one of all the other modules, carries out the above explained operations, namely, comparing the values of the words stored in the columns for selecting a column. (This selection operation consists in fixing the selection bit S of the module MS of each column).

Before explaining the operation of a module, as will be subsequently described by reference to FIG. 3, the operation of all modules in the comparison and select mode will be considered. This will be better understood by referring back to the example used in relation to FIGS. 1A-1P. Table I herebelow shows the content of the memory points of the modules of the circuit of FIG. 2 which correspond to the state of the step of FIG. 1G.

TABLE I

|      | 1 | 2 | 3 | 4 | 5 | 6 | 7 | 8 |
|------|---|---|---|---|---|---|---|---|
| MI1  | 0 | 0 | 0 | 0 | 0 | 0 | 0 | 1 |
| MS2  | 1 | 0 | 0 | 0 | 0 | 1 | 0 | # |
| MD3  | 0 | 0 | 0 | 1 | 0 | 0 | 1 | # |
| MD4  | 0 | 1 | 1 | 0 | 1 | 0 | 0 | # |
| MD5  | 0 | 0 | 1 | 0 | 0 | 1 | 0 | # |
| MD6  | 1 | 1 | 1 | 0 | 1 | 0 | 0 | # |
| MP7  | 1 | 1 | 1 | 1 | 0 | 0 | 0 | 0 |
| MP8  | 1 | 1 | 0 | 0 | 1 | 1 | 0 | 0 |
| MP9  | 1 | 0 | 1 | 0 | 1 | 0 | 1 | 0 |

It will be assumed, in order to simplify the explanations, that the modules are sequentially analyzed row after row, starting from the first row. For this purpose, the modules in the first row are first considered. The modules containing a "1" (as shown in column 8) will then correspond to the largest words, and each of these modules will provide for the lower module, through its exclusion output, an exclusion bit (shown above by an underlined number) which extends downwards from one module to the other so as to exclude the corresponding column from having a subsequent analyses. Thus, the following rows are processed instead and it will be possible to identify the word for which no exclusion bit appears in the lowest row as being the smallest. Following such identification, the selection bit of this word will be marked with 1.

Of course, this circuit has to take into account some additional logic combinations, i.e., a no exclusion bit is authorized to be emitted in the case when, for all the columns not previously excluded, all the modules of the same row contain a "1" ( for example, in TABLE I modules $MD_{42}$, $MD_{43}$ and $MD_{45}$, then modules $MD_{62}$ and $MD_{65}$, then, module $MP_{85}$ and finally module $MP_{95}$).

All the operations are carried out by using each logic processing unit as contained in the modules.

FIG. 3 illustrates one of the modules in the form of a logic circuit.

In the case of modules MI and MS, a memory point is constituted by a D-type flip-flop 20 having a bit input D connected to one of the input lines $IN_i$; an enable input connected to one of the write lines $W_j$; an output Q connected to one of the output lines OUTd through a three-state gate 21 activated by a control input connected to one of the read lines Rj; and a SET input. Modules MP do not include any flip-flop and the lines for MI and MP correspond to the flip-flop outputs. They are connected either to ground (logic 0), or to the supply voltage Vcc (logic 1) for establishing in binary mode the priority coefficients n−j.

An OR gate 22 receives the output Q of flip-flop 20 and the exclusion output $x_{i-1,j}$ of the module of the preceding line. The output of the OR gate 22 feeds the gate of a P-channel MOS transistor 23, the source of which is connected to the supply voltage Vcc and the drain to line Zi A resistive means 24 (one per line) connects line Zi to ground. All the MOS transistors 23 of the same row and the resistive means 24, constitute an NAND gate. Such a NAND gate has an output line Zi and its inputs are each connected to the outputs of the OR gate 22 of the same row. The OR gate can be considered as a zero detector which provides a "1" at its output when at least one of its inputs is at "0". The inputs of an AND gate 25 are connected one to the output Q of flip-flop 20 and the other to line Zi. An OR gate 26 receives the output of the AND gate 25 and the exclusion output $x_{i-j}$ of the preceding module. The output of OR gate 26 constitutes the exclusion output $X_{ij}$.

A module operates as follows.

A "1" on its exclusion input (xi−1, j−1) indicates that the column is to be excluded from analyses, i.e., a bit "1" has been detected in at least one of the modules of the column for the preceding rows. This "1" is present at one of the inputs of the OR gate 26 and is transmitted to its output, which is the exclusion output $X_{ij}$. Thus, this function for each module is to directly transmit an exclusion bit provided by a preceding module of the same column.

If a "0" is present on the exclusion input ($X_{1-j,j}$=0), this means that the column to which the considered module belongs has not yet been identified as comprising a word greater than the one(s) contained in at least another column. The content Q of flip-flop 20 is present on one of the inputs of the AND gate 25 and is transmitted to the output, as well as to output $X_{ij}$ through the OR gate 26, only if the line Zi which is connected to the other input of the AND gate 25, is equal to "1". This means that, if the content Q of flip-flop 20 is "1", this indicates for the first time that the column to which the particular module belongs is to be excluded from the analyses, provided all the other flip-flops, pertaining to the modules of the same row that do not receive an exclusion bit are not also to "1".

Line Zi is forced to 1 by any of the modules of the same row, the MOS transistor 23 of which is conductive, that is, the OR gate 22 of which has its output to 0. This occurs only if the exclusion input and the content of the flip-flop are both equal to 0, which means that the column to which belongs the considered module inevitably contains one of the smallest words.

Line Zi is forced to 0 by the resistive means 24 only if all the MOS transistors 23 of the modules of a same row are off. This occurs when each of the modules of the row has its exclusion input equal to 1 or the content of its flip-flop 20 to 1. This happens when all the modules of the row and in the non-excluded columns contain "1" in their flip-flop 20. In that case, all the outputs of the AND gates 25 of the modules of the row are to "0" and this 0 is transmitted to the exclusion outputs of all the modules of the row contained in the non-excluded columns.

Since it is known that line Zi of a row i is equal to 0 only if each module of the row i has either its exclusion input equal to 1 or the content of its flip-flop 20 equal to 1, it is possible to sum up the values taken by the exclusion output $X_{ij}$ of a module placed at row i and column j by the following TABLE II:

TABLE II

| $Z_i$ | $X_{i-1,j}$ | $X_{ij}$ |
|---|---|---|
| # | 1 | 1 |
| 0 | 0 | 0 |
| 1 | 0 | Q |

The three columns respectively show: the values taken by line $Z_i$, the exclusion output of the module of the preceding row i−1 and of the same column j, and the exclusion output $X_{ij}$ of the considered module. Symbol "#" represents indifferently a 0 or a 1 and Q designates the content of flip-flop 20 for the considered module.

In addition to these calculation functions, each module carries out the following "write" and "read" operations.

A "1" present on line Wj (which is connected to the enable input of flip-flop 20) charges into the flip-flop the bit present at that time on line INi which is connected to the bit input D of the flip-flop. A "1" present on the read line Rj (which is connected to the control input of the three-state gate 21) transmits the content Q of the flip-flop onto the line OUTi which is connected to the output of the three-state gate 21.

It is noted that, because of their structure, all modules of FIG. 2, like those of FIG. 3, operate continuously and simultaneously to select, as explained above, the column containing the smallest word, while their exclusion outputs oscillate then are stabilized at fixed values at a time after the arrival of a datum value and anterior to the arrival of another datum.

Further explanations are given herebelow, especially regarding the sequence of operations of the selection circuit of FIG. 2.

Figure 4:
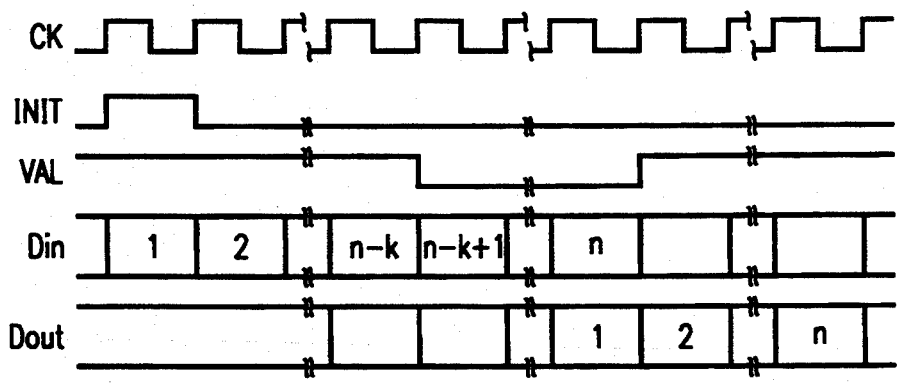
FIG. 4 shows time diagrams characterizing the operative cycles of the circuits of FIGS. 2 and 3.

FIG. 4 shows a time diagram wherein CK is the clock signal; INIT the initialization signal applied to line $W_1$ and at the input of the addressing circuit 11; VAL the enabling signal applied to the enable line; Din the times at which each datum Dj appears on the lines INi of the input bus; and Dout the times at which each datum Dj appears at the circuit output on lines OUTi of the output bus.

Initially, signal INIT is set to 0 while signal VAL is to "1". Signals Din and Dout are random signals. As soon as the first datum $D_1$ of a sequence of data appears, signal INIT is set to "1" during a clock period, while authorizing "writing" of datum D1 in modules MD of the first column; the flip-flops of modules MI of the first row are set to "1" and the addressing circuit 11 is initialized. During the next rising edge of the clock signal which corresponds to the occurrence of the next datum D2, the addressing circuit exhibits a "1" on line W2 during a clock period, thereby to authorize "writing" datum D2 into modules MD of the second column, and so forth until the n data have been written successively in each set of modules $MD_{i1}$-$MD_{in}$. As soon as one of the data is inputted, all the matrix modules start calculating the column containing the smallest word and a 0 appears at the exclusion output of the last module of the column.

Meanwhile, as soon as the $(n-k)^{th}$ datum is written, signal VAL is set to "0" until the $n^{th}$ datum is written. During this time interval, flip-flops 10 are active, that is, their outputs Q* are no longer forced to 0 by signal VAL and so that they will take into account the bits present at their inputs. Especially, during the next rising edge of the clock (as soon as the next datum comes in), flip-flop 10 of the column containing the smallest word transmits to its output Q a 1 which sets the corresponding module MS.

As soon as the last datum in modules MD of the last column is written, the addressing circuit 11 authorizes the first datum D1 to be transferred as well as the selection bit S1 distributed and stored in modules $MD_{31}$-$MD_{2+rl}$ and MS1 on the data output bus, and so forth until modules MD and MS of the last column are "read".

Figure 5:
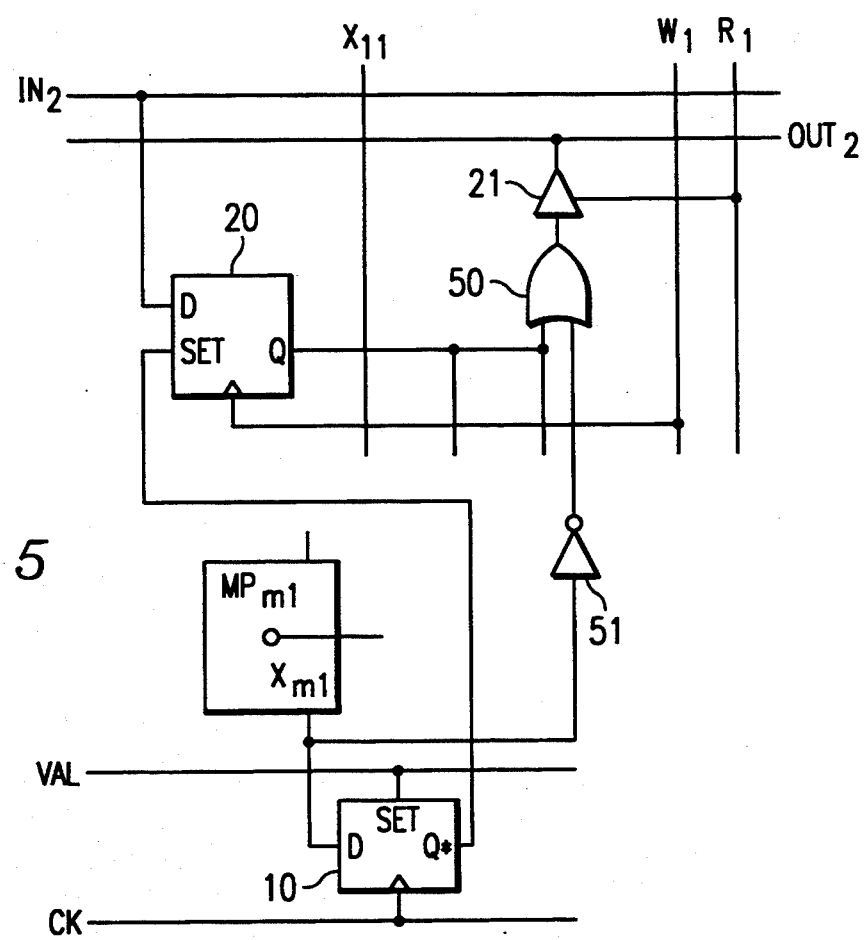
FIG. 5 represents a modification of one of the modules in relation to the circuit of FIG. 2 as used for avoiding possible drawbacks.

FIG. 5 illustrates a modification of the circuit according to the invention, intended for avoiding the above drawback, wherein, when the first datum D1 is the last datum marked, the marking bit S1 of datum D1 has not yet been forced to a 1 whereas the marking bit and datum $D_m$ are "read". FIG. 5 partially shows the circuit including a modified module MS21, the last module $MP_{ml}$ and the flip-flop 10 as used for setting module MS21.

Between the three-state gate 21 and the output of flip-flop 20 of module MS21, is inserted an OR gate 50 receiving at one input the output of flip-flop 20, and at another input the exclusion bit Xml (received from module $MP_{ml}$ through an inverter 51). The operation will be better understood by referring to FIGS. 1H and 4.

As soon as the last datum D8 is written, comparison starts and, soon after, an exclusion bit Xml equal to 0 appears at the output of module $MP_{ml}$ indicating that datum $D_1$ has to be marked. Setting to "1" of the marking flip-flop 20 will occur only during the next rising edge of clock CK when the exclusion bit Xml is transferred to the inverted output Q* of flip-flop 10. Simultaneously, datum D1 and module MS21 are "read". The "write" line R1 is set and gate 21 transmits to line OUT2 the output of the OR gate 50. Since in that case flipflop 20 has not yet passed to "1", the output of the OR gate 50, and therefore line OUT2, will be set when bit Xml is at "0". Thus, the marking bit $S_1$ present on line OUT2 is set a short time after the bits of datum $D_1$ is set on the other lines OUT. However, since generally these bits are taken into account by the circuit which uses them during the next decreasing edge of clock CK, this delay, lower than the half clock period, will not cause any error.

A circuit known and easy to implement by those skilled in the art can be placed after the circuit of FIG. 2 in order to cancel any data marked by "1" appearing in their corresponding selection bits S.

It is possible to start "writing" the first datum of a new sequence of data while the data of a previous sequence of data are being "read".

It will also be noted that the circuit of the embodiment of the invention described in relation with FIG. 2 is of a systolic-array type circuit in which each module constitutes a systole. This type of circuit is easily integrable because of its simple routing.

Moreover, it can be demonstrated that the selection duration of the smallest of the n columns is proportional to:

$Tz+(m-1)TM$, where Tz designates the setting time of a bit on a line Z, m designates the number of modules in a column and TM designates the time necessary for calculating a module. This period is particularly short.

The invention has been described as part of an image processing, but it applies to any case where it is desired to select the k greatest or smallest data in a set of data.

The logic circuit shown in FIG. 3 is given by way of example. It is possible to obtain the same results with a large number of various logic circuits. The functions of these circuits can also be achieved with a programmed microprocessor appropriately programmed and associated with the memories.

The priority modules MP have been described as having a fixed content, but it can be modified like the content of any other modules for obtaining variable priority orders.

I claim:

1. A method for sorting out, from an incoming sequence of n binary data values, k greatest ones of said data values, comprising machine-executed steps of:
   a) sequentially writing each of said data values, into successive respective ones of n one-word memory locations, as part of a respective data word comprising:
      a first, inhibition bit, and a second, selection bit;
      third bits representing said respective data values, said third bits being less significant, within said data word, than said first inhibition bit, and said second selection bit; and
      fourth bits corresponding to a number representative of a position of said respective data value within said sequence, said fourth bits being less significant than said third bits;
   b) upon inception of said incoming sequence of binary data values, setting said respective first inhibition bits of said n memory locations to a first value;
   c) while writing said third data bits of each said data word, concurrently resetting said first inhibition bits and second selection bits of said corresponding word to a second value;

d) after arrival of a predetermined number of said words, detecting, after arrival of each further data value until arrival of an $n^{th}$ data value, a smallest data word stored in said memory locations, and setting said second selection bit of said smallest data word to said first value accordingly; and e) sequentially reading, from a time when a signal corresponding to said $n^{th}$ data value arrives, said data bits from ones of said memory locations, and conditionally processing said data bits of each said data word depending upon whether said respective selection bit thereof has said second value.

2. A method according to claim 1, wherein during step e), said data values are read in an order in which said data values have been written during step a).

3. A method according to claim 1, wherein said fourth bits are associated with ones of said data values in decreasing order.

4. A method according to claim 1, wherein said fourth bits are associated with ones of said data values in increasing order.

5. A method according to claim 1, wherein said step d) is begun after arrival of said signal corresponding to a $k^{th}$ data word.

6. A method according to claim 1, wherein said first, inhibition bit is more significant, within said data word, than said second, selection bit.

7. A method according to claim 1, wherein n=64.

8. A method according to claim 1, wherein said fourth bits remain constant for a given memory location.

9. A circuit for identifying k greatest data values in a sequence of n data values sequentially arriving on an input bus as binary logic signals, comprising:

a memory point matrix of n columns and m rows, each column being assigned to a word corresponding to one of said data values and comprising, in order of increasing row numbers and decreasing bit weights:

a first inhibition memory point connected to be set by an initialization signal and reset by arrival of a respective one of said data values, a second selection memory point connected to an output bus line, and connected to be reset by arrival of a respective one of said data values, third memory points connected to lines of a data input bus, and connected and configured to receive and store bits of a respective one of said data value, and fourth memory points containing a number representative of a position rank of said data values within said sequence;

a first circuit for addressing each of said columns according to an input rate of data values, and storing therein said data value present on said lines of said input bus;

a second circuit, active only after arrival of a predetermined one of said data values, for detecting a smallest word and setting a corresponding one of said second memory points as soon as a next data value has arrived; and a third circuit for addressing each of said columns in accordance with said data rate and writing respective bits contained in said second and third memory points on said lines of said data output bus as soon as an $n^{th}$ data value is written.

10. A circuit according to claim 9, wherein said second circuit comprises modules, each being associated to a memory point and each comprising:

a connection to output Q of an associated one of said memory point, an exclusion output $X_{ij}$ which, if a current row i is a last (m), is connected to a set input of said second selection memory point of current column j, an intermediate output, an exclusion input connected, either to a respective said exclusion output $X_{ij}$ of one of said modules of current column j and of preceding row i−j, or else to "0" if said current row is first;

a detection input, connected to all output of a detection logic circuit which is common to all modules of said current row j and connected to receive as inputs said intermediate outputs of said modules;

said respective exclusion output $X_{ij}$ taking values summed up in the following table, where symbol "#" designates 0 or 1 indifferently:

| $Z_i$ | $X_{i-1,j}$ | $X_{ij}$ |
|---|---|---|
| # | 1 | 1 |
| 0 | 0 | 0 |
| 1 | 0 | Q | said intermediate output taking a value of 1 if said respective output $X_{i-1,j}$ and/or said respective output Q is "1".

11. A circuit according to claim 10, wherein said detection logic circuit provides a value 0 at output $Z_i$ only when all said intermediate outputs of said modules of said current row j are set to "1".

12. A circuit according to claim 10, wherein said fourth memory points have no data input or data output connection.

13. A circuit according to claim 10, wherein said detection logic circuit is implemented as wire-AND logic.

14. A circuit according to claim 9, wherein circuits for addressing each column are constituted by a shift register.

15. A circuit according to claim 9, wherein said second selection memory points are authorized to be set by an active enable signal between arrivals of an $(n-k)^{th}$ datum and said $n^{th}$ datum.

16. A circuit according to claim 9, wherein said fourth memory points have no data input or data output connection.

17. A circuit according to claim 9, wherein n=64.

18. A method for identifying, in an incoming series of sequences of n digital data values, k largest data values in each said sequence of n values, comprising machine-executed steps of:

as soon as each new one of said sequences starts, setting said respective inhibition bits of all of n reserved locations to a first value;

sequentially writing into successive ones of n reserved memory locations, for each of said data values, a respective data word comprising: an inhibition bit, a selection bit, and data bits representing said respective data value;

while writing each of said data values into respective ones of said memory locations, resetting said first inhibition bits and second selection bits of said respective memory location to said first value;

upon arrival of each said data value, after arrival of a predetermined number of said data values in said sequence, finding a smallest word stored in said n memory locations and setting said selection bit of said smallest data value to a second value and after an $n^{th}$ data value arrives, sequentially reading stored data words from said memory locations and conditionally outputting each said data value depending upon whether a respective said selection bit has said second value.

19. A method according to claim 18, wherein n=64.

20. A method according to claim 18, wherein each said memory location also includes one or more fixed priority bits which are less significant than said data bits, said priority bits being distinct for each of said memory locations.

* * * * *